UNITED STATES PATENT OFFICE.

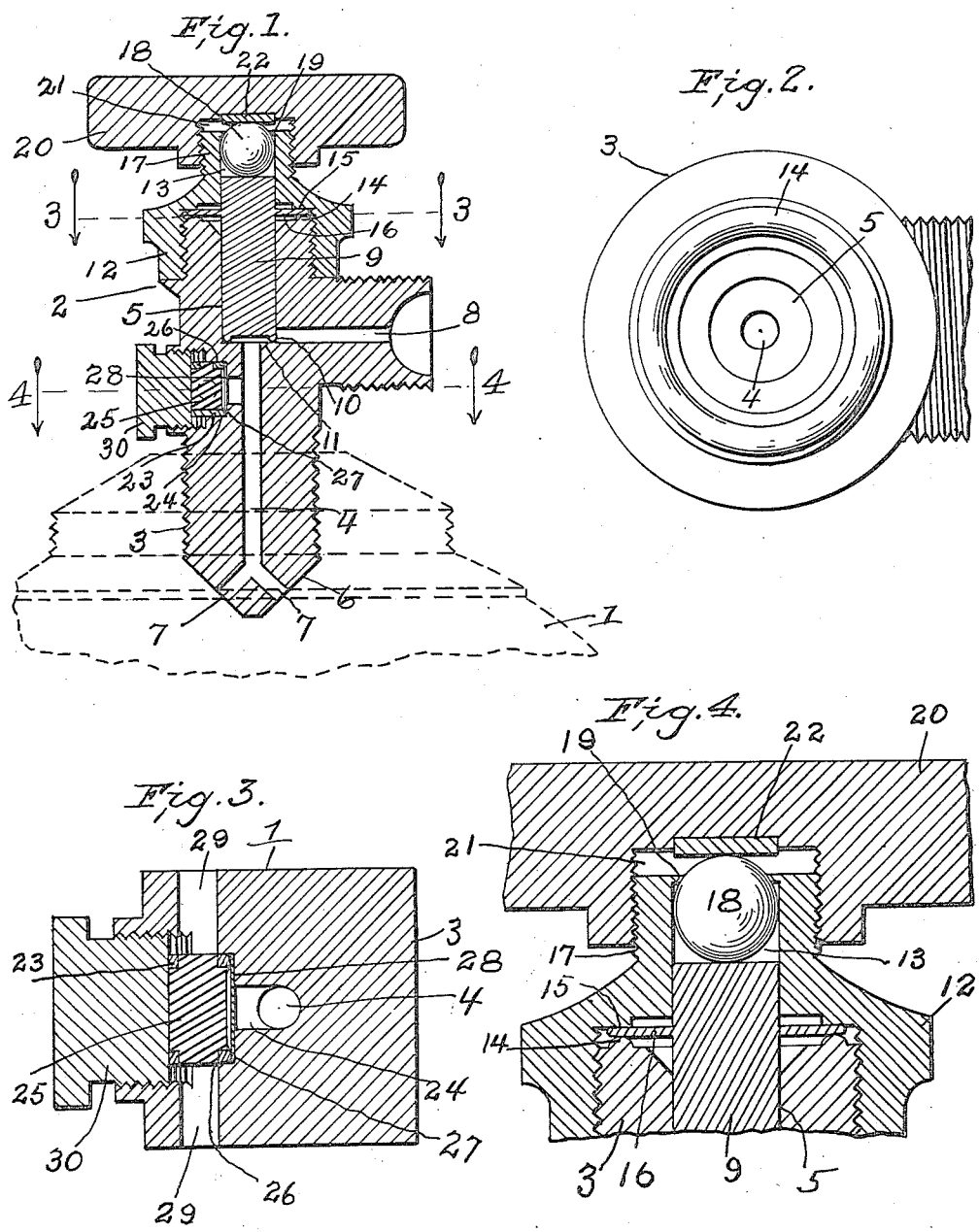

WILLIAM F. BREIDENBACH, OF INDIANAPOLIS, INDIANA.

VALVE FOR OXYGEN-TANKS.

1,276,715.

Specification of Letters Patent. Patented Aug. 27, 1918.

Application filed August 15, 1917. Serial No. 186,418.

*To all whom it may concern:*

Be it known that I, WILLIAM F. BREIDENBACH, a citizen of the United States, and a resident of Indianapolis, county of Marion and State of Indiana, have invented a certain new and useful Valve for Oxygen-Tanks; and I do hereby declare that the following is a full, clear, and exact description thereof, reference being had to the accompanying drawings, in which like letters refer to like parts.

My invention relates to new and useful improvements in valves and more particularly to that class adapted to be used in connection with oxygen tanks or similar devices in which high pressure explosives are contained; and my object is to provide a valve of relative simplicity and one that can be constructed at a minimum expense and also one that will be positive in its operation and easily controlled for opening or closing the valve.

A further object is to provide a cap for the valve having a central bore in which is positioned a plunger adapted to control the passage of the oxygen or other particles from the tank, said plunger having integral yielding means for preventing leakage of the oxygen between the plunger and the walls of the cap.

A further object is to provide a seat upon the body of the valve casing and a shoulder on the inner face of the cap for impinging against the sealing mechanism to provide a perfect seal by pressure or friction.

A further object is to provide an interiorly threaded operating handle which is adapted to be turned onto or off of a threaded portion of the valve casing cap.

A further object is to provide a ball bearing adapted to seat upon the upper end of the plunger and receive pressure from the face of the operating handle for forcing the lower end of the plunger against the valve seat to completely close the valve.

A further object is to provide an insert wear plate on the inner face of the operating handle for engagement with the ball bearing.

A further object is to provide a central lead in through the valve casing, which extends from the lower end of the casing to the inner end of the bore provided to receive the plunger, said lead having a bifurcated lower end.

And a further object is to provide a safety device adapted to contain fusible material whereby when an unusual or high degree of atmospheric heat is encountered the material in the safety device will be fused and the contents of the tank permitted to escape, thus preventing an explosion of the tank.

Other objects and advantages will be hereinafter more fully disclosed and pointed out in the accompanying specifications.

In the accompanying drawings which are made a part of this application,

Figure 1 is a central, vertical, longitudinal, sectional view through the valve, Fig. 2 is an enlarged top plan view of the upper end of the valve casing as seen from line 3—3, Fig. 1.

Fig. 3 is an enlarged transverse sectional view through the valve as seen on line 4—4, Fig. 1, and Fig. 4 is an enlarged detail sectional view of the upper end of the valve structure, showing a ball bearing and parts coöperating therewith.

Referring to the drawings in which similar reference numerals designate corresponding parts throughout the several views, 1 indicates a tank such as is commonly used for containing oxygen, and 2 indicates my improved form of valve structure to be employed for discharging the oxygen from the tank. The valve comprises a casing or body portion 3, through the lower portion of which extends a lead or bore 4, the upper end of said lead communicating with an enlarged bore 5, extending inwardly from the upper end of the valve casing. The lower end of the casing or body 3 is preferably tapered or provided with a conical face 6 and in view of the fact that scale sometimes forms on the interior of the tank and when loosened, sometimes settles over the lead or bore through the valve casing, thus preventing the escape of the contents of the tank, the lower end of the lead 4 is bifurcated to form lateral extensions 7 of the lead 4, so that should sediment or scale cover one of the openings 7 the other opening will be free for the passage of the oxygen.

Extending transversely to the lead 4 is a discharge opening 8, the inner end of which intersects the bore 5 at a point substantially in line with the upper end of the lead 4, so that the contents of the tank may readily escape through the valve structure when desired.

Extending into the bore 5 is a plunger or valve proper 9, the lower end of which is provided with a rounded annular rib 10 adapted to seat upon the floor 11 of the bore 5 and when said rib is engaged with the floor under pressure, the contents of the tank will be prevented from passing through the lead 4.

The upper end of the casing or body 3 is exteriorly threaded to receive an interiorly threaded cap 12, said cap having a vertically extending opening 13 in registration with the bore 5 of the casing, said opening 13 receiving the upper end of the plunger 9. The upper end of the threaded portion of the casing 3 is provided with an annular semi-circular flange 14, while the inner wall of the cap 12 is provided with an annular shoulder 15, adapted to register with the flange 14, and between said members 14 and 15 is clamped the peripheral edge of a flexible collar or plate 16, which is formed integral with the plunger 9 and when properly clamped between said flange and shoulder, prevents leakage of the contents of the tank around the plunger, but at the same time permits sufficient longitudinal movement of the plunger, owing to the extreme pressure of the contents of the tank, to allow the oxygen to escape below the plunger and pass out through the discharge opening 8.

The upper end of the cap 12 is provided with a neck 17, through which the opening 13 continues, and in which is seated a bearing ball 18, said ball being prevented from passing upwardly out of the opening 13 by forming a shoulder 19 on the inner face of the opening 13 at the upper end of the neck.

The plunger 9 is forced into engagement with the floor or seat 11 by directing pressure on the bearing ball 18 through the medium of an operating handle 20, said handle having a central depression or opening 21, which is interiorly threaded and engages the exterior threads of the neck 17, so that when the handle is turned on to the neck, the ball 18 and plunger 9 will be forced inwardly, causing the rib 10 to bind upon the floor of the bore 5 with sufficient pressure to prevent passage of the contents of the tank below the plunger.

As the handle 20 is preferably constructed of soft metal, a friction plate 22 is preferably fixed to the handle 20 in any suitable manner, central of the depression 21, against which the ball 18 bears and as the plate 22 is made of hardened metal, wear between the ball and plate will be reduced to a minimum.

Owing to the fact that excessive heat will cause the tank to explode, after the temperature has expanded the contents to a certain degree, I have provided means for permitting the contents of the tank to escape under such condition. To this end, therefore, a shell or sleeve 23 is introduced into a recess 24 in one wall of the casing and at a point below the upper end of the lead 4, said recess communicating with said lead and being of a greater diameter than the diameter of the discharge opening 8. The shell 23 is filled with a fusible material 25, which, under ordinary circumstances, will remain solid and resist the pressure caused by the contents of the tank, the fusible material being held in fixed relation with the shell 23, when in solid condition, by providing openings 26 in the walls of the shell into which the fusible material enters when poured into the shell.

The inner end of the shell 23 rests against a shoulder 27 formed in the recess 24 and to prevent leakage around said shell, a plate 28, of thin material is placed over the inner end of the shell and forced against said shoulder, the material forming said plate being such that when the fusible material is removed from the shell the pressure of the contents of the tank will destroy the plate by blowing a hole therethrough. The inner end of the fusible material is made concave so that the entire force of the shell 23 will be directed against the outer edge of the plate 28, thus binding the same against the shoulder 27 with such force that it will be impossible for any leakage to occur at this point.

Extending transversely of the shell 23 and from side to side of the casing 3 is a bore 29, which registers with certain of the openings 26 in the wall of the shell 23, so that when the material within the shell is fused the contents of the tank can readily escape through the recess 24 and bore 29.

The shell 23 is securely held in position and in engagement with the plate 28 by threading a plug 30 into the outer end of the recess 24, and when said plug is properly entered in the recess it will be impossible for the shell or fusible material contained therein to be disturbed or moved away from the shoulder within the recess by mere pressure of the contents of the tank against the same.

In operation, when it is desired to use the oxygen from the tank, a slight reverse rotation is given the operating handle 20 which relieves the pressure thereof against the bearing ball 18, whereupon the plunger 9, owing to the excessive pressure of the contents of the tank, will be slightly elevated, whereupon the contents of the tank will pass outwardly below the lower end of the plug and through the discharge opening 8. As soon as a sufficient quantity of the product of the tank has been used the operating handle 20 is again returned to its initial position, which will result in forcing the plunger 9 downwardly against the floor of the bore 5 with sufficient force to completely shut off the flow of gas through the structure. Should the tank for any reason be subjected to excessive external heat such as would cause an expansion of the contents of the tank to such a degree as to cause an explosion, such excess heat would cause the material in the sleeve 23 to fuse before the temperature of the contents of the tank would be raised to such an extent to cause the explosion, the fusing of said material permitting the contents of the tank to rapidly escape, thus reducing the pressure within the tank.

The invention claimed is:

1. A valve for high pressure tanks, comprising a casing having an exteriorly threaded upper end and a bore extending longitudinally of the casing from the upper end thereof and part way through said casing, the remaining portion of said casing having a central, longitudinally extending lead communicating at its upper end with said bore and terminating in lateral extensions at its lower end, said casing also having a discharge opening extending laterally to the trend of said bore and lead and entering said bore at the point of juncture between said bore and lead, a plunger adapted to enter said bore, a circumferential rib at the lower end of said plunger adapted to engage the floor of said bore, a peripheral semicircular flange on the upper end of said casing, a cap adapted to engage the threaded portion of the casing, a shoulder formed on said cap and in position to register with said flange, a flexible collar integral with the plunger and adapted to be impinged between said flange and shoulder, and means to direct downward pressure on said plunger for forcing said rib against the floor of the bore to close communication between said lead and discharge opening.

2. A valve for high pressure tanks, comprising a casing having a bore therein and a lead communicating with the bore, said lead having lateral extensions at its lower end, a plunger in said bore and extending above the casing, a flexible collar integral with said plunger, a cap adapted to bind the edge of the collar against the end of the casing, said cap having an opening for the reception of the upper end of the plunger, a ball in said opening above the plunger, a shoulder at the upper end of the cap and extending into the bore to limit the upward movement of the ball, an operating handle threaded on to said cap adapted to direct inward pressure against the ball and plunger for closing the passage through said lead, and a bearing plate carried by said operating handle for engagement with said ball.

3. In a valve for high pressure tanks, a casing having an enlarged bore at one end extending part way through the casing, the lower end of said casing being substantially conical, and a lead extending from said bore to the opposite end of the casing of less diameter than the bore, the lower end of said lead being bifurcated, the bifurcated ends intersecting the tapered portion of the casing at diametrically opposite points.

In witness whereof I have hereunto affixed my signature.

WILLIAM F. BREIDENBACH.